United States Patent
Ochi et al.

(10) Patent No.: US 10,543,505 B2
(45) Date of Patent: Jan. 28, 2020

(54) NOZZLE FOR GREASE APPLICATION AND METHODS FOR USING

(71) Applicant: NSK LTD., Tokyo (JP)

(72) Inventors: Shunsuke Ochi, Fujisawa (JP); Satoshi Araki, Maebashi (JP)

(73) Assignee: NSK LTD., Tokyo (JP)

( * ) Notice: Subject to any disclaimer, the term of this patent is extended or adjusted under 35 U.S.C. 154(b) by 269 days.

(21) Appl. No.: 15/548,139

(22) PCT Filed: Jan. 29, 2016

(86) PCT No.: PCT/JP2016/052790
§ 371 (c)(1),
(2) Date: Aug. 2, 2017

(87) PCT Pub. No.: WO2016/132869
PCT Pub. Date: Aug. 25, 2016

(65) Prior Publication Data
US 2018/0036759 A1 Feb. 8, 2018

(30) Foreign Application Priority Data
Feb. 16, 2015 (JP) .................... 2015-027199

(51) Int. Cl.
*B05C 5/02* (2006.01)
*B05D 3/12* (2006.01)
(Continued)

(52) U.S. Cl.
CPC .............. *B05C 5/0254* (2013.01); *B05B 1/26* (2013.01); *B05C 11/028* (2013.01); *B05C 11/04* (2013.01);
(Continued)

(58) Field of Classification Search
CPC ........ F16H 57/0464; F16N 11/08; F16N 3/10; F16N 5/02; B05C 5/02; B05C 11/04;
(Continued)

(56) References Cited

U.S. PATENT DOCUMENTS 3,854,553 A * 12/1974 Miller ................... E02F 9/121
184/6.12
4,244,447 A * 1/1981 Hanitz .................... E02F 9/00
184/104.1
(Continued)

FOREIGN PATENT DOCUMENTS

CA 1138784 A1 * 1/1983
CN 101499412 A * 8/2009 ........... B05C 5/0254
(Continued)

OTHER PUBLICATIONS

Communication dated Nov. 5, 2018, from the State Intellectual Property Office of People's Republic of China in counterpart Application No. 201680010020.4.
(Continued)

*Primary Examiner* — William P Fletcher, III
(74) *Attorney, Agent, or Firm* — Sughrue Mion, PLLC (57) ABSTRACT

A tip end face of a body part 13 is provided at a part in front of a discharge port with respect to a rotational direction of a worm wheel 2 with a protruding part 16, and a tip end face of the protruding part 16 is provided with a grease-pushing surface part 17 configured to push grease into concave portions of a worm wheel teeth 3 while raking and leveling the grease so that the grease is substantially uniform in a width direction and in a circumferential direction of the worm wheel teeth 3. Also, the tip end face of the body part 13 is provided at a rear part of the discharge port with respect to the rotational direction of the worm wheel 2 with a protruding wall part 18 for preventing the grease 1 from (Continued)

moving rearwards with respect to the rotational direction of the worm wheel 2.

9 Claims, 9 Drawing Sheets

(51) Int. Cl.
*F16H 57/04* (2010.01)
*B05B 1/26* (2006.01)
*B05C 11/04* (2006.01)
*F16N 5/02* (2006.01)
*F16N 11/08* (2006.01)
*B05C 11/02* (2006.01)
*F16N 3/10* (2006.01)

(52) U.S. Cl.
CPC .......... *B05D 3/12* (2013.01); *F16H 57/0464* (2013.01); *F16N 3/10* (2013.01); *F16N 5/02* (2013.01); *F16N 11/08* (2013.01); *B05C 5/0225* (2013.01); *B05C 5/0241* (2013.01)

(58) Field of Classification Search
CPC ... B05C 5/0254; B05C 5/0225; B05C 5/0241; B05C 11/028; B05B 1/26; B05D 3/12
USPC ....... 427/355; 184/6.12, 105.2; 118/56, 100, 118/103, 107
See application file for complete search history.

(56) References Cited

U.S. PATENT DOCUMENTS

| | | | |
|---|---|---|---|
| 5,925,414 A | 7/1999 | Buechele et al. | |
| 6,117,490 A | 9/2000 | Nishida et al. | |
| 6,902,209 B2 * | 6/2005 | McInerney | F16N 3/12 285/12 |
| 10,119,608 B2 * | 11/2018 | Misaki | F16N 7/14 |
| 2007/0010773 A1 | 1/2007 | Watts | |
| 2007/0107773 A1 | 5/2007 | Fork et al. | |
| 2009/0194509 A1 * | 8/2009 | Nada | B05C 5/0254 216/83 |
| 2013/0192930 A1 * | 8/2013 | Segovia | F16H 57/0431 184/14 |
| 2015/0330564 A1 * | 11/2015 | Mueller | F16N 25/00 184/7.4 |
| 2016/0129470 A1 | 5/2016 | Tada | |

FOREIGN PATENT DOCUMENTS

| | | |
|---|---|---|
| EP | 0919288 A2 | 6/1999 |
| JP | 8233197 A | 9/1996 |
| JP | 10156254 A | 6/1998 |
| JP | 2010-258142 A | 11/2010 |
| JP | 2010258142 A * | 11/2010 |
| JP | 201513272 A | 1/2015 |
| WO | 2014192579 A1 | 12/2014 |

OTHER PUBLICATIONS

Communication dated Jun. 4, 2018 issued by the European Patent Office in counterpart European Patent Application No. 16752258.0.
International Search Report dated Apr. 26, 2016, by the International Searching Authority in counterpart International Application No. PCT/JP2016/052790 (PCT/ISA/210).
Written Opinion dated Apr. 26, 2016, by the International Searching Authority in counterpart International Application No. PCT/JP2016/052790 (PCT/ISA/237).

* cited by examiner

NOZZLE FOR GREASE APPLICATION AND METHODS FOR USING

TECHNICAL FIELD

The present invention relates to improvements on a nozzle for grease application configured to apply grease to a member to be applied such as a worm wheel having a concave-convex part (a tooth part) formed on an outer peripheral surface or an inner peripheral surface thereof.

RELATED ART

Many gears are incorporated in a power transmission part of an automobile and a variety of industrial machines, and meshing portions between the gears are lubricated by grease. Particularly, in order to improve durability of each gear, high-viscosity grease (Japanese Industrial Standard consistency number is 3 or greater) is used in some cases. Specifically, for example, meshing portions between worm teeth of a worm shaft and worm wheel teeth of a worm wheel configuring a worm-type reducer to be incorporated in an electric power steering device are lubricated by the high-viscosity grease.

The worm shaft and the worm wheel are mounted to each other at a state where the grease is applied to at least one of the worm teeth and the worm wheel teeth. As a method of applying the high-viscosity grease to a circumferential concave-convex part (a tooth part) formed on an outer peripheral surface or an inner peripheral surface of a worm wheel and the like, a following method is considered, for example. Discharge ports configured to discharge the grease are intermittently provided in a circumferential direction with being brought close to the concave-convex part. Then, the grease is discharged from each discharge port towards the concave-convex part. However, according to this method, it is difficult to uniformly apply the grease. In particular, there is a possibility that the grease will not be able to be pushed into concave portions of the concave-convex part (the grease will not be able to be uniformly spread in the concave portions).

Patent Document 1 discloses a technology of applying a fluid (paint 12) having a certain degree of viscosity to (a part of) a cylindrical surface of a member to be applied (a base material 5) by using a so-called plane nozzle (a nozzle 6). However, the nozzle disclosed in Patent Document 1 does not consider applying the high-viscosity grease to the circumferential concave-convex part. Thus, even when the grease is applied to the concave-convex part by using the nozzle disclosed in Patent Document 1, the grease may not be sufficiently sent into the concave portions of the concave-convex part.

In the meantime, the numbers in parentheses indicate reference numerals denoted in Patent Document 1.

CITATION LIST

Patent Document

Patent Document 1: Japanese Patent Application Publication No. Hei10-156254A

SUMMARY OF THE INVENTION

Problems to be Solved

The present invention has been made in view of the above situations, and an object thereof is to implement a structure of a nozzle for grease application capable of securely pushing grease into concave portions of a concave-convex part of a member to be applied and preventing the member to be applied, an application device and the like from being dirtied due to extra grease.

Means for Solving Problems

A nozzle for grease application of the present invention has a discharge port provided to open towards a tip end face of a body part. At a state where the discharge port is brought close to a circumferential concave-convex part (a tooth part) formed on a circumferential surface (an outer peripheral surface or an inner peripheral surface) of a member to be applied such as a gear, for example, while the member to be applied is rotated about a central axis thereof, high-viscosity grease is discharged from the discharge port, so that the grease is continuously applied to the concave-convex part from a front side towards a rear side of the member to be applied with respect to a rotational direction thereof.

Particularly, in the nozzle for grease application of the present invention, the tip end face of the body part is provided at a part in front of the discharge port with respect to the rotational direction of the member to be applied with a grease-pushing surface part configured to push (fill) the grease into concave portions of the concave-convex part while raking and leveling the grease discharged from the discharge port and attached to the concave-convex part so that the grease is substantially uniform in a width direction and in a circumferential direction of the concave-convex part.

Also, the tip end face of the body part is provided at a rear part of the discharge port with respect to the rotational direction of the member to be applied with a protruding wall part protruding from the tip end face of the body part and configured to prevent a surplus of the grease raked and leveled by the grease-pushing surface part from moving rearwards with respect to the rotational direction of the member to be applied.

When implementing the nozzle for grease application of the present invention, preferably, the grease-pushing surface part is provided on a tip end face of a protruding part protruding from the tip end face of the body part and provided at a part of the tip end face of the body part in front of the discharge port with respect to the rotational direction of the member to be applied.

When implementing the present invention, preferably, the protruding part is configured by a plurality of projections intermittently provided in a width direction of the body part.

When implementing the nozzle for grease application of the present invention, preferably, a width dimension of the discharge port is made smaller than a width dimension of the concave-convex part, and both a width dimension of the protruding wall part and a width dimension of the grease-pushing surface part are made equal to or greater than the width dimension of the concave-convex part.

Effects of the Invention

According to the nozzle for grease application of the present invention configured as described above, it is possible to securely push the grease into concave portions of the concave-convex part of the member to be applied (to securely fill the grease into the concave portions) and preventing the member to be applied, an application device and the like from being dirtied due to the extra grease.

That is, the tip end face of the body part is provided at the part in front of the discharge port with respect to the rotational direction of the member to be applied with the grease-pushing surface part, and the grease discharged from the discharge port and attached to the concave-convex part is raked, leveled and pushed into the concave portions of the concave-convex part by the grease-pushing surface part. Therefore, it is possible to securely supply the grease into the concave portions of the concave-convex part (to evenly spread the grease in the entire concave portions).

Also, the tip end face of the body part is provided at the rear part of the discharge port with respect to the rotational direction of the member to be applied with the protruding wall part. Thereby, it is possible to prevent the grease from moving rearwards with respect to the rotational direction of the member to be applied between the tip end face of the body part and the concave-convex part. As a result, it is possible to prevent a situation where the grease is attached/deposited to a rear surface of the body part with respect to the rotational direction of the member to be applied, is peeled off from the rear surface and dirties the member to be applied, an application device to which the nozzle for grease application is incorporated, and the like.

BRIEF DESCRIPTION OF THE DRAWINGS

FIGS. 9A to 9C depict a second example of the embodiment of the present invention, in which

FIGS. 11A and 11B depict a first example of another shape of the protruding part, in which

DETAILED DESCRIPTION OF EMBODIMENTS

First Example of Embodiment

FIGS. 1 to 6 depict a first example of an embodiment of the present invention. In the meantime, a feature of the present invention, including the first example, is a structure of a nozzle for grease application 5 for securely sending high-viscosity (gel phase) grease 1 into concave portions (portions between respective teeth configuring worm wheel teeth 3) of the worm wheel teeth (a concave-convex part) 3 of a worm wheel 2, which is a member to be applied, and preventing the worm wheel 2, a grease application device 4 and the like from being dirtied due to the extra grease 1. A basic structure of the grease application device 4 for applying the grease 1 introduced from a grease pump 6 to the worm wheel teeth 3 of the worm wheel 2 by a grease application gun 7 is similar to that of the grease application device that has been known in the related art. First, the structure of the grease application device 4 is described with reference to FIG. 1.

Figure 1:
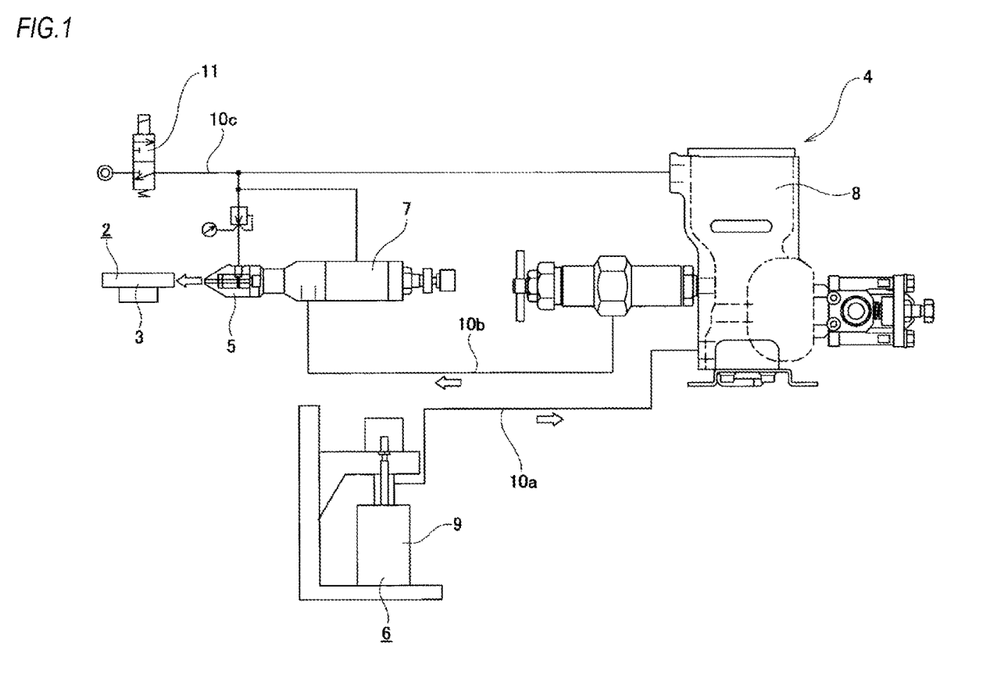
FIG. 1 is a pictorial view for illustrating a structure of a grease application device in which a nozzle for grease application in accordance with a first example of an embodiment of the present invention is incorporated.

The grease application device 4 includes a grease pump 6, a continuous flow valve 8 and a grease application gun 7. The grease pump 6 is to supply (to pneumatically transport) the grease 1 stored in a grease receptacle 9 to the continuous flow valve 8 through a hose 10a. The continuous flow valve 8 is to send the grease 1 to the grease application gun 7 through a hose 10b after adjusting a flow rate and a flow velocity of the grease 1 pneumatically transported from the grease pump 6. The grease application gun 7 is to discharge (push out) the grease 1, which is sent from the continuous flow valve 8, from a nozzle for grease application 5 mounted to a tip portion of the gun by a compressed air sent from a compressed air source 11 through a hose 10c and to apply the grease to the worm wheel teeth 3 of the worm wheel 2.

In the first example, the nozzle for grease application 5 is made by assembling a plurality of components formed by injection molding of a synthetic resin, and has a mounting part 12 and a body part 13. The mounting part 12 has a hollow cylindrical shape, and is mounted to the tip portion of the grease application gun 7 by internally fitting and fixing an outer peripheral surface or externally fitting and fixing an inner peripheral surface to the tip portion of the grease application gun 7. The body part 13 is provided to be continuous to the mounting part 12 at a downstream side (a lower side in FIGS. 2 to 4B) of the mounting part 12 with respect to a flowing direction (an upper and lower direction in FIGS. 2 to 4B) α of the grease 1 flowing in the nozzle for grease application 5. A tip end face (a lower end face in FIGS. 2 to 4B) of the body part 13 is provided with a discharge port 14 for discharging the grease 1. In the first example, a width dimension (an axial dimension of the worm wheel 2) $W_{14}$ of the discharge port 14 is made smaller than a width dimension $W_3$ of the worm wheel teeth 3 ($W_{14}<W_3$). Specifically, for example, when applying the grease 1 to the worm wheel teeth 3, which is to be incorporated in an electric power steering device for automobile and has the width dimension $W_3$ of about 16 mm, the width dimension $W_{14}$ of the discharge port 14 is set to about 12 mm. At this time, a degree by which the width dimension $W_{14}$ of the discharge port 14 is made smaller than the width dimension $W_{13}$ of the worm wheel teeth 3 is determined in design, in accordance with an amount (an applying thickness) and a viscosity of the grease 1 to be applied, a tooth depth (depths of the concave portions) of the worm wheel teeth 3, and the like. Also, a plurality of (three, in the shown example) column parts 15, 15 is provided to bridge over inner surfaces of the body part 13 so as to rectify the flow of the grease 1 flowing in the body part 13.

The column parts 15, 15 are arranged at an upstream side of the discharge port 14 with respect to the flowing direction α of the grease. If the column parts 15, 15 are not provided, a discharge rate of the grease is not uniform in the width direction of the discharge port 14. Since the grease is supplied from a supply passage provided in the mounting part 12, the discharge rate is high in an area of the discharge port 14 in front of (on an extension line of) the mounting part 12 and is lower at both ends of the discharge port 14. The column parts 15, 15 are provided so as to suppress the non-uniformity of the discharge rate.

The tip end face of the body part 13 is inclined in a direction facing towards a downstream side (a lower side in FIGS. 2 and 3) of the flowing direction α as it goes towards one side (a front side with respect to a rotational direction γ of the worm wheel 2, which will be described later; a left side in FIGS. 2 and 3) of a direction β perpendicular to the width direction of the nozzle for grease application 5 and the flowing direction α of the grease 1 flowing in the nozzle for grease application 5. Also, the tip end face of the body part 13 is provided at a part (i.e., one side part of the discharge port 14 perpendicular to the width direction of the discharge port 14) adjacent to one side of the discharge port 14 with respect to the direction β with a protruding part 16 protruding towards a downstream side with respect to the flowing direction α. A tip end face of the protruding part 16 is configured as a grease-pushing surface part 17 for raking and leveling the grease 1 discharged from the discharge port 14 above the worm wheel teeth 3 and sending the grease into the concave portions of the worm wheel teeth 3. In the meantime, the tip end face of the body part 13 is provided at a part (i.e., the other side part of the discharge port 14 perpendicular to the width direction of the discharge port 14) adjacent to the other side (a rear side with respect to the rotational direction γ of the worm wheel 2) of the discharge port 14 with respect to the direction β with a protruding wall part 18 protruding towards a downstream side with respect to the flowing direction α. In the first example, both a width dimension $W_{17}$ of the grease-pushing surface part 17 and a width dimension $W_{18}$ of the protruding wall part 18 are made equal to or greater than the width dimension $W_3$ of the worm wheel teeth 3 ($W_{17} \geq W_3$, $W_{18} \geq W_3$).

Figure 2:
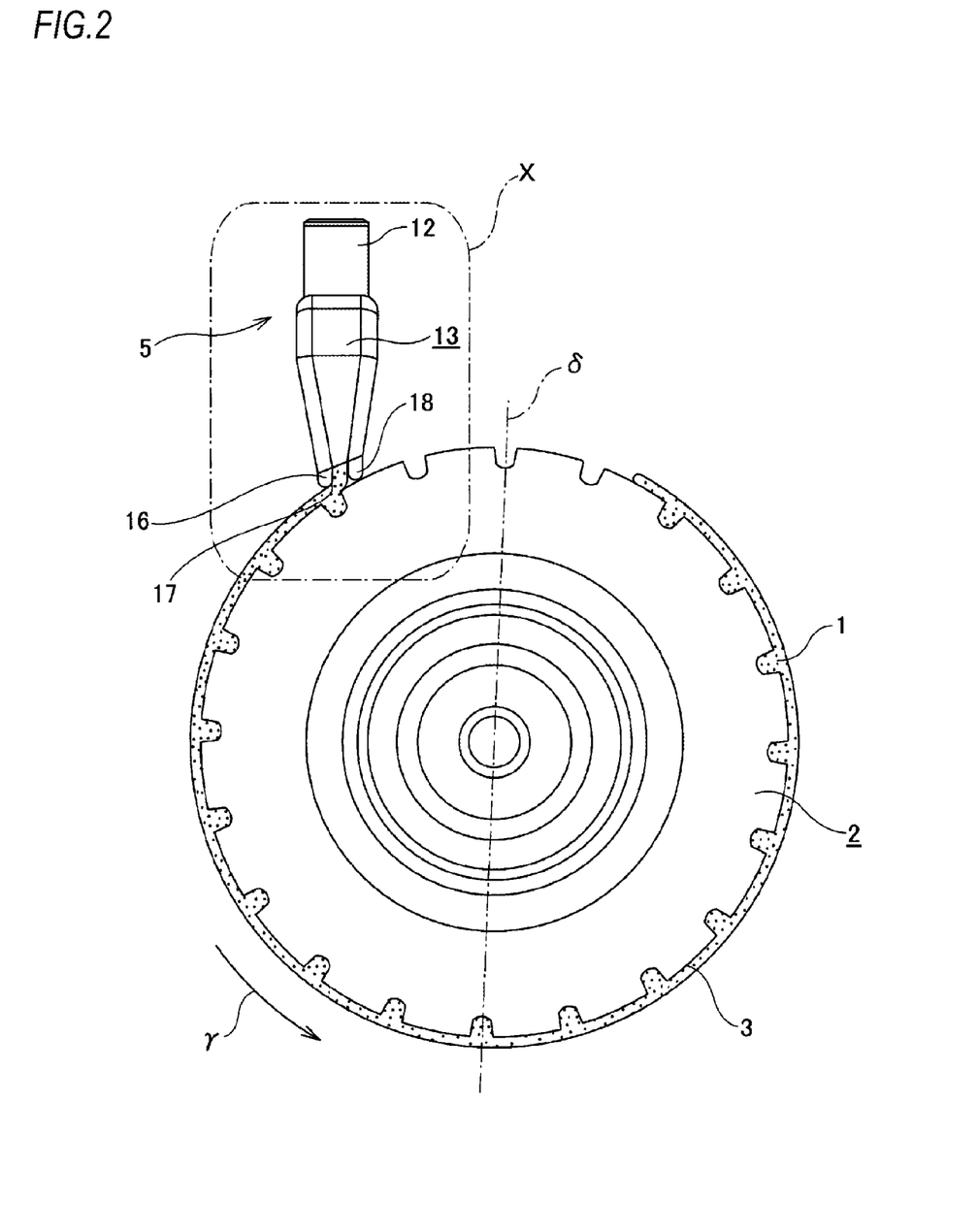
FIG. 2 depicts the nozzle for grease application of the first example and a worm wheel.
Figure 3:
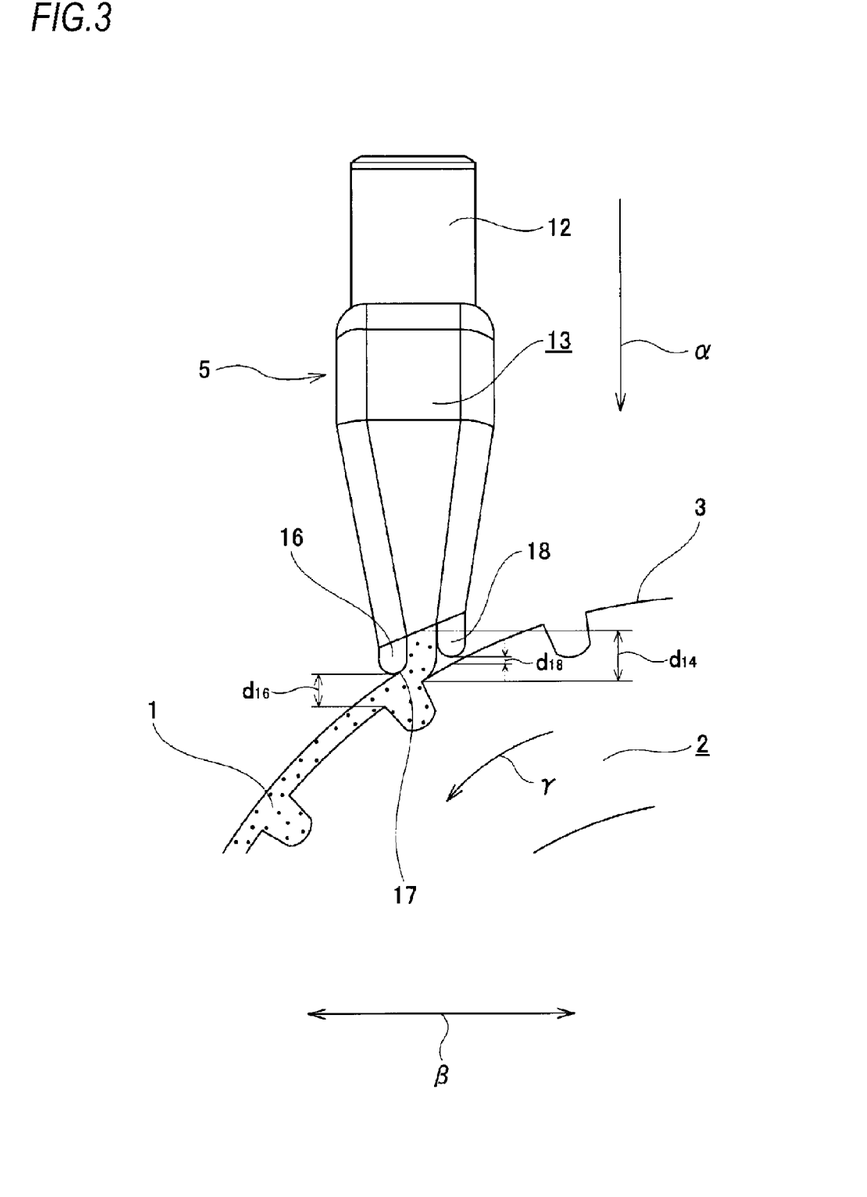
FIG. 3 is an enlarged sectional view of an X part of FIG. 2.
Figure 4A:
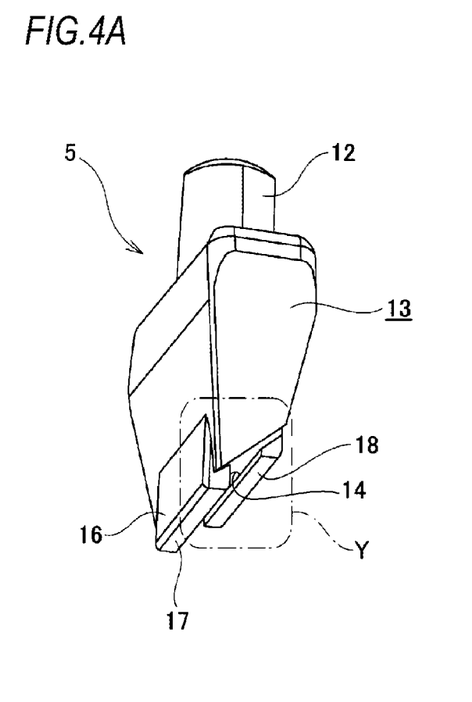
FIG. 4A is a perspective view of the nozzle for grease application.
Figure 4B:
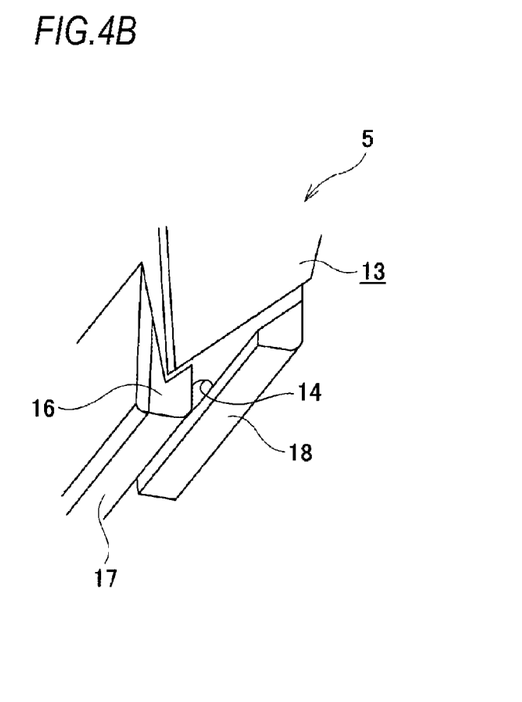
FIG. 4B is an enlarged view of a Y part of FIG. 4A.
Figure 5A:
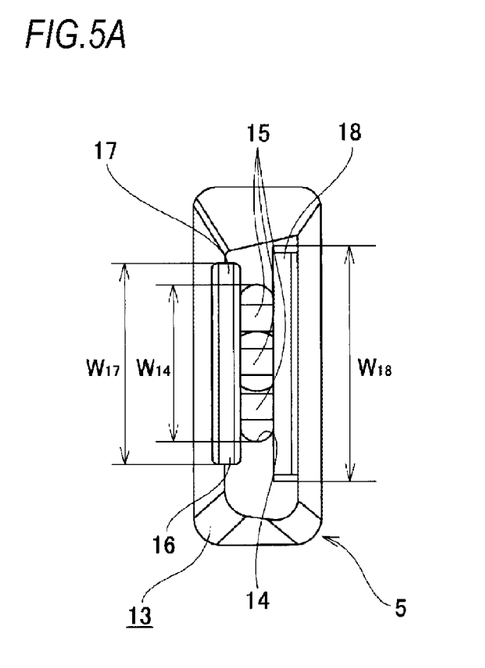
FIG. 5A depicts the nozzle for grease application, as seen from below of FIG. 4A.
Figure 5B:
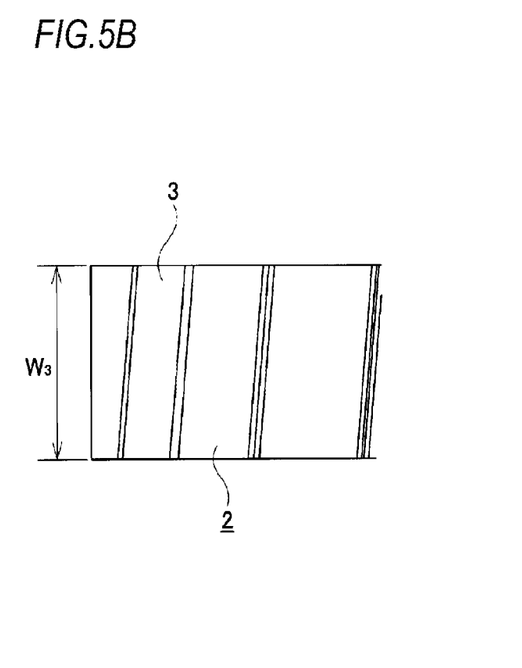
FIG. 5B depicts a part of an outer peripheral surface of the worm wheel, as seen from a radial direction.
Figure 6:
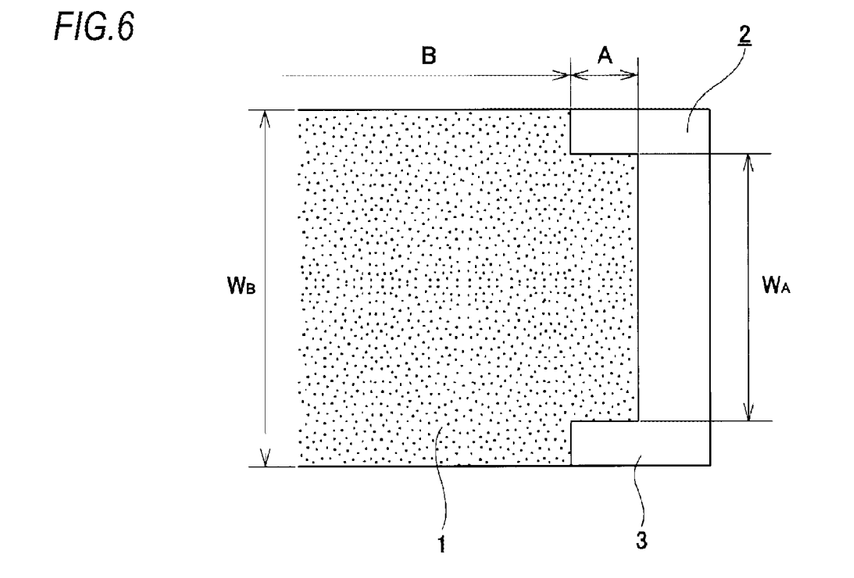
FIG. 6 illustrates a state of grease applied to worm wheel teeth.

When applying the high-viscosity grease 1 to the worm wheel teeth 3 of the worm wheel 2 by the grease application device 4, as shown in FIGS. 2 and 3, the discharge port 14 of the nozzle for grease application 5 is brought close to the worm wheel teeth 3. At this state, an interval $d_{16}$ between the worm wheel teeth 3 and the protruding part 16 with respect to the flowing direction α is made smaller than an interval $d_{14}$ between the discharge port 14 and the worm wheel teeth and greater than an interval $d_{18}$ between the protruding wall part 18 and the worm wheel teeth ($d_{18} < d_{16} < d_{14}$). The interval $d_{16}$ between the worm wheel teeth 3 and the protruding part 16 is determined depending on the amount (an applying thickness) of the grease 1 to be applied to the worm wheel teeth 3, and is about 1.5 mm, for example. In the meantime, the interval $d_{18}$ between the worm wheel teeth 3 and the protruding wall part 18 is preferably set as small as possible inasmuch as it is possible to prevent interference (contact) between the worm wheel teeth 3 and the protruding wall part 18 when applying the grease 1, and can be set to about 0.5 mm, for example. Also, in the first example, a position to which the discharge port 14 is brought close is a position offset to one side of the direction β from a virtual plane δ passing to a central axis of the worm wheel 2 and parallel with the flowing direction α. In the meantime, an arrangement direction of the nozzle for grease application 5 (the flowing direction α of the grease 1 flowing in the nozzle for grease application 5) may be a vertical or horizontal direction.

In any case, at this state, the worm wheel 2 is rotated at a constant speed in a counterclockwise direction γ of FIGS. 2 and 3 by a driving source such as an electric motor or the like (not shown). At the same time, the grease 1 stored in the grease receptacle 9 is sent into the grease application gun 7 via the grease pump 6 and the continuous flow valve 8. Then, the grease 1 sent into the grease application gun 7 is discharged at a constant flow rate towards the worm wheel teeth 3 from the discharge port 14 of the nozzle for grease application 5 mounted to the tip portion of the grease application gun 7.

The grease 1 discharged from the discharge port 14 and attached to the worm wheel teeth 3 is pressed and crushed by the grease-pushing surface part 17 provided on the tip end face of the protruding part 16 as the worm wheel 2 is rotated. Thereby, the grease 1 is raked and leveled and is sent into the concave portions of the worm wheel teeth 3 (filled in the concave portions of the worm wheel teeth 3). That is, as shown with a range A in FIG. 6, a width dimension $w_A$ of the grease 1 attached to the worm wheel teeth 3 immediately after it is discharged from the discharge port 14 is substantially the same as the width dimension $W_{14}$ of the discharge port 14 and is smaller than the width dimension $W_3$ of the worm wheel teeth 3 ($w_A \approx W_{14} < W_3$). From this state, the grease 1 attached to the worm wheel teeth 3 is pressed and crushed by the grease-pushing surface part 17, as the worm wheel 2 is rotated. As a result, as shown with a range B in FIG. 6, the thickness of the grease 1 is raked and leveled so as to be substantially uniform in the width direction and in the circumferential direction of the worm wheel teeth 3 so that a width dimension $w_B$ of the grease 1 attached to the worm wheel teeth 3 is to be the same as the width dimension $W_3$ of the worm wheel teeth 3, and a part of the grease is sent into the concave portions of the worm wheel teeth 3. Therefore, it is possible to securely send the grease 1 into the concave portions of the worm wheel teeth 3 (to evenly spread the grease in the entire concave portions).

Figure 7:
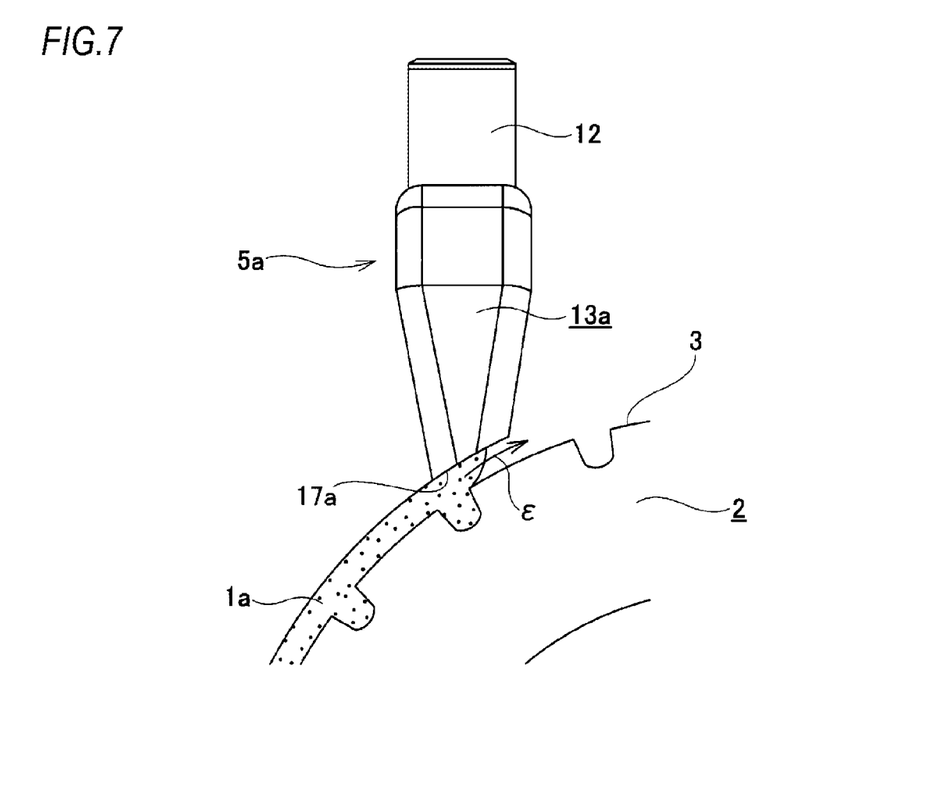
FIG. 7 is a similar view to FIG. 3, illustrating a problem that is to occur when a protruding wall part is not provided.
Figure 8A:
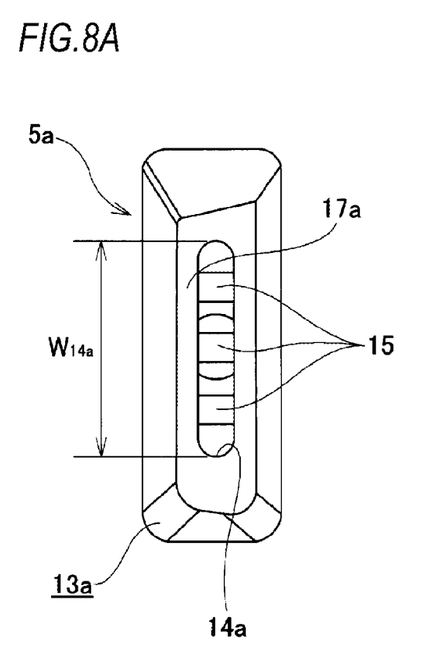
FIGS. 8A and 8B are similar views to FIG. 5, illustrating a problem that is to occur when the protruding wall part is not provided.
Figure 8B:
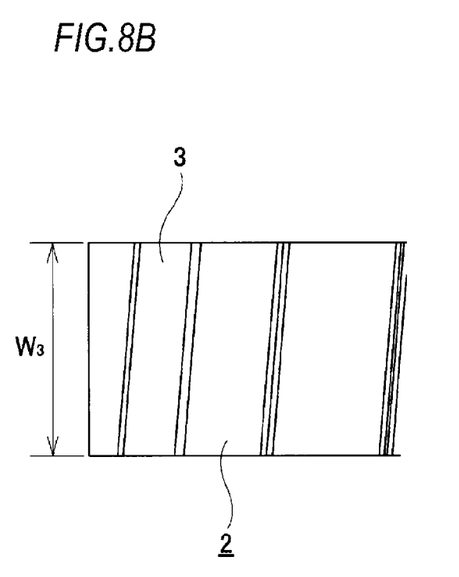
Figure 9A:
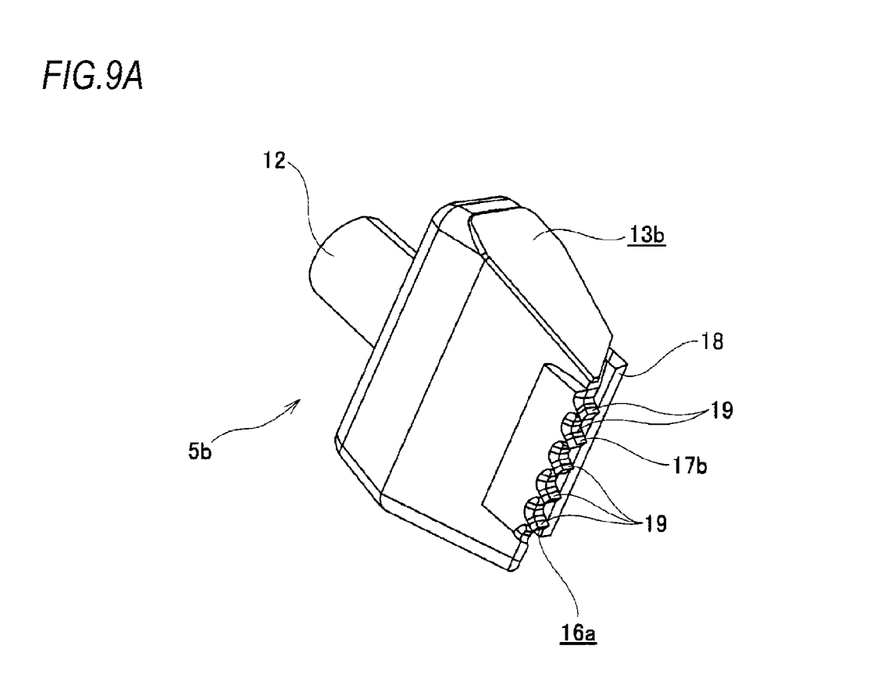
FIG. 9A is a perspective view.
Figure 9B:
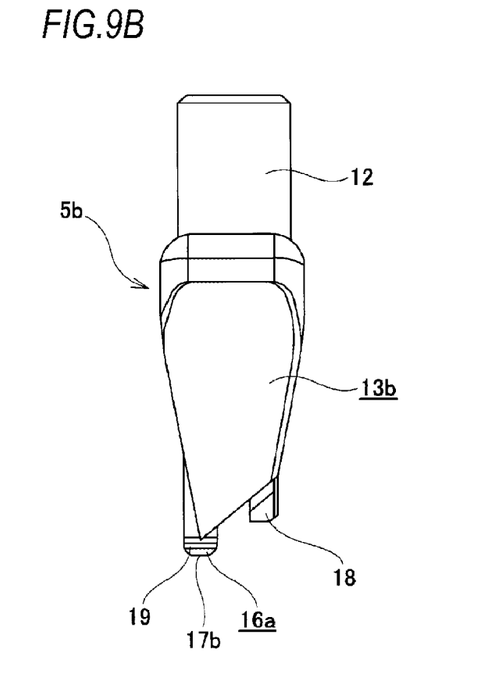
FIG. 9B is a side view and FIG. 9C is a bottom view, as seen from below of FIG. 9B.
Figure 9C:
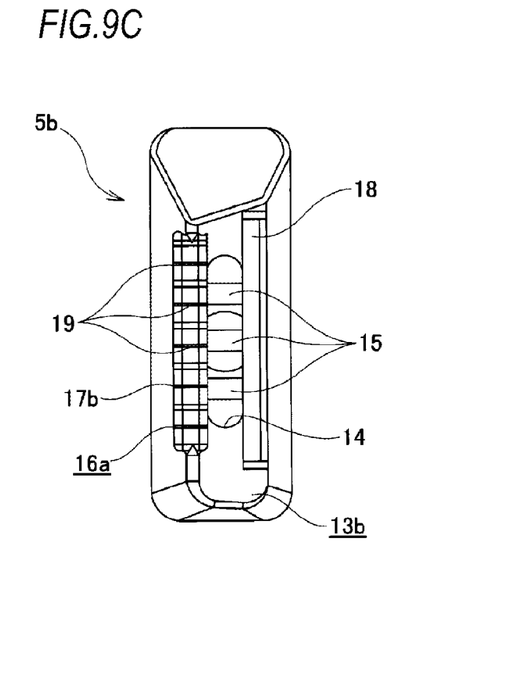
Figure 10A:
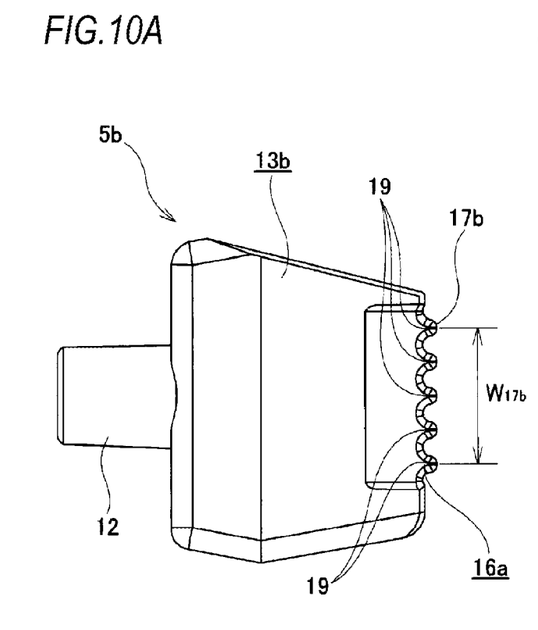
FIG. 10A is an end view, as seen from the left of FIG. 9C.
Figure 10B:
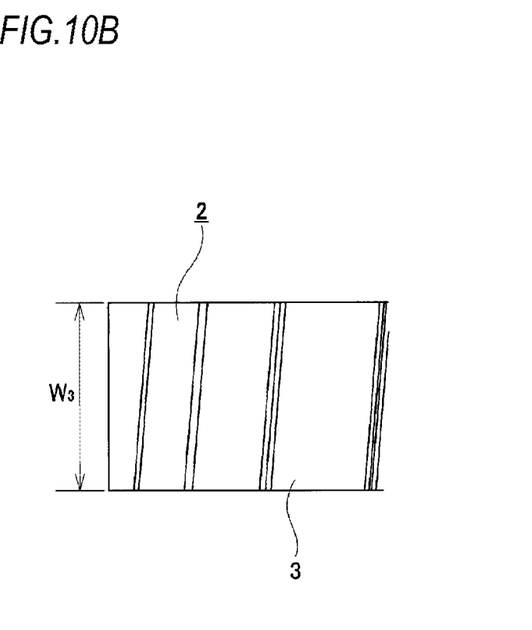
FIG. 10B is a similar view to FIG. 5B.

Also, in the first example, the tip end face of the body part 13 is provided with the protruding wall part 18, so that the grease 1 discharged from the discharge port 14 is prevented from moving rearwards (an opposite direction to an arrow γ in FIG. 3) with respect to the rotational direction of the worm wheel 2 between the tip end face of the body part 13 and the worm wheel teeth 3. That is, as shown in FIGS. 7 to 8B, according to a nozzle for grease application 5a having no protruding wall part 18, a surplus of grease 1a discharged from a discharge port 14a, attached to the worm wheel teeth 3 and pressed and crushed by a grease-pushing surface part 17a moves in an arrow direction (the rear of the rotational direction of the worm wheel 2) between a tip end face of the body part 13a and the worm wheel teeth 3. Particularly, in the example shown in FIGS. 7 to 8B, a width dimension $W_{14a}$ of the discharge port 14a and the width dimension $W_3$ of the worm wheel teeth 3 are made to be the same ($W_{14a} = W_3$), so that the grease 1a is likely to be extra grease. The surplus of the grease 1a is attached/deposited to a side surface of the body part 13a (a rear surface (a right surface in FIG. 7) with respect to the rotational direction of the worm wheel 2). When the grease is peeled off from the side surface of the body part 13a, the worm wheel 2 and the grease application device 4 may be dirtied.

In contrast, according to the nozzle for grease application 5 of the first example, since the width dimension $W_{14}$ of the discharge port 14 is made smaller than the width dimension $W_3$ of the worm wheel teeth 3 ($W_{14} < W_3$), even when the grease is pressed and crushed by the grease-pushing surface part 17a, the grease 1 attached to the worm wheel teeth 3 is difficult to be redundant. Also, in the first example, the tip end face of the body part 13 is provided at a part close to the rear side of the discharge port 14 with respect to the rotational direction of the worm wheel 2 with the protruding wall part 18. For this reason, when the surplus of the grease 1 intends to move rearwards with respect to the rotational direction of the worm wheel 2 between the tip end face of the body part 13 and the worm wheel teeth 3, the grease is blocked by the protruding wall part 18. Meanwhile, in the first example, in order to prevent the interference between the worm wheel teeth 3 and the protruding wall part 18, a slight gap (a gap of about 0.5 mm) is formed between the worm wheel teeth 3 and the protruding wall part 18. However, since the high-viscosity grease is used as the grease 1, it is possible to prevent the grease 1 from moving rearwards with respect to the rotational direction of the worm wheel 2 through the slight gap. Therefore, according to the nozzle for grease application 5 of the first example, it is possible to prevent the surplus of the grease 1 from being attached/deposited to the side surface of the body part 13 (the rear surface with respect to the rotational direction of the worm wheel 2), so that it is possible to prevent the worm wheel 2 and the grease application device 4 from being dirtied.

Meanwhile, in the first example, the worm wheel 2 is rotated at a constant angular velocity, and the flow rate of the grease 1 to be discharged from the nozzle for grease application 5 is constant. However, it is possible to change the rotating speed of the worm wheel 2 at the state where the flow rate of the grease 1 to be discharged from the nozzle for grease application 5 is constant. Specifically, a rotational phase of the worm wheel 2 is detected, and the rotating speed of the worm wheel 2 is slowed down at a state where the discharge port 14 faces the concave portions of the worm wheel teeth 3. Thereby, it is possible to securely send the grease 1 into the concave portions of the worm wheel teeth 3.

Second Example of Embodiment

FIGS. 9A to 10C depict a second example of the embodiment of the present invention. In a nozzle for grease application 5b of the second example, a protruding part 16a provided on a tip end face of a body part 13b is configured by a plurality of (five, in the shown example) projections 19, 19. The respective projections 19, 19 have a substantially triangular shape, as seen from the rotational direction of the worm wheel 2, and are intermittently provided on the tip end face of the body part 13b in the width direction. That is, in the second example, a grease-pushing surface part 17b configured by tip end faces of the respective projections 19, 19 has a waveform. Also, a width dimension (a dimension between tip portions of the projections 19, 19, which are located at both ends in the width direction, of the respective projections 19, 19) $W_{17b}$ of the grease-pushing surface part 17b is made smaller than the width dimension $W_3$ of the worm wheel teeth 3 ($W_{17b} < W_3$).

According to the nozzle for grease application 5b of the second example, it is possible to adjust an amount of the grease 1 attached to the worm wheel teeth 3, which is to be pressed and crushed by the grease-pushing surface part 17b. Therefore, it is possible to reduce an amount of the grease 1 moving rearwards with respect to the rotational direction of the worm wheel 2 between the tip end face of the body part 13b and the worm wheel teeth 3. Also, since the grease-pushing surface part 17b is formed to have a waveform, it is possible to further increase the favorable adhesion of the grease 1 to the worm wheel teeth 3. That is, at a state where the worm wheel is taken out from a processing device, the cutting oil used to form the worm wheel teeth is attached to the worm wheel teeth. At this state, even when the grease is discharged towards the worm wheel teeth, an oil film of the cutting oil is interposed between the grease and the worm wheel teeth, so that it is not possible to obtain the sufficient adhesion. Therefore, when using the worm wheel, the grease may be peeled off due to a centrifugal force associated with the rotation of the worm wheel. In contrast, according to the second example, the grease-pushing surface part 17b is formed to have a waveform, so that as the worm wheel 2 is rotated, the grease 1 attached to the worm wheel teeth 3 is stirred by the grease-pushing surface part 17b (the grease 1 is pushed in the width direction by the respective projections 19, 19) and is pressed and crushed (pressed towards the worm wheel teeth 3). As a result, it is possible to destroy the oil film interposed between the worm wheel teeth 3 and the grease 1, thereby further improving the adhesion of the grease 1 to the worm wheel teeth 3. Meanwhile, in the second example, since the respective projections 19, 19 have a substantially triangular shape, the grease 1 is likely to flow outwards in the width direction at both end portions of the grease-pushing surface part 17b in the width direction. Therefore, even when the pressed and crushed amount of the grease 1 is adjusted, it is possible to rake and level the grease 1 so that the thickness of the grease 1 is substantially to be uniform over the worm wheel teeth 3 in the width direction (so that a sectional shape is to be a waveform conforming to the grease-pushing surface part 17b).

Figure 11A:
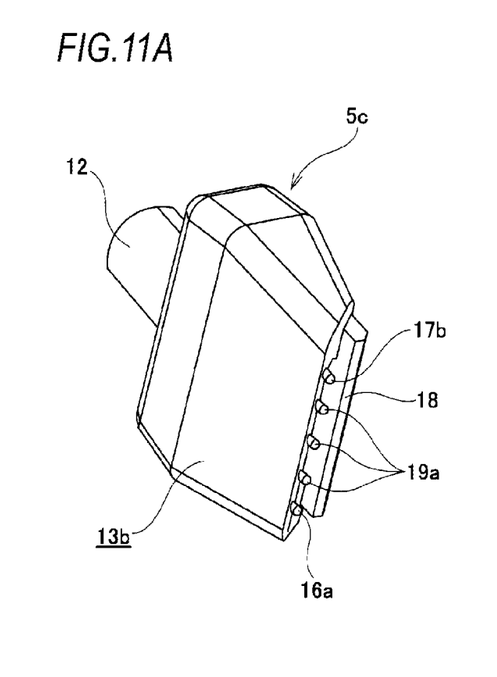
FIG. 11A is a perspective view and FIG. 11B is an end view.
Figure 11B:
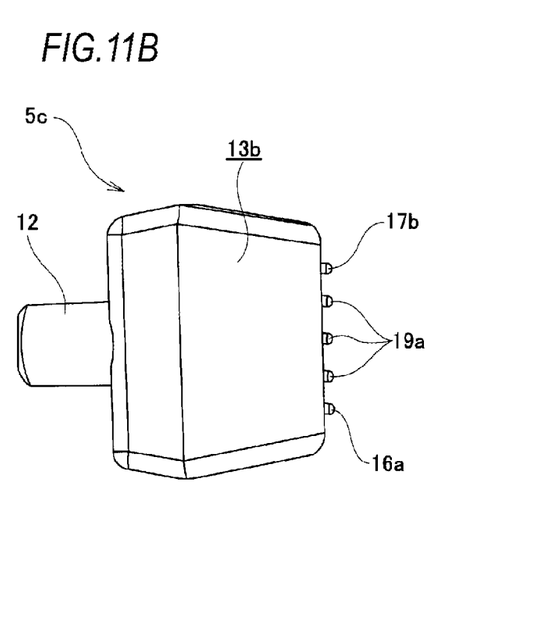
Figure 12A:
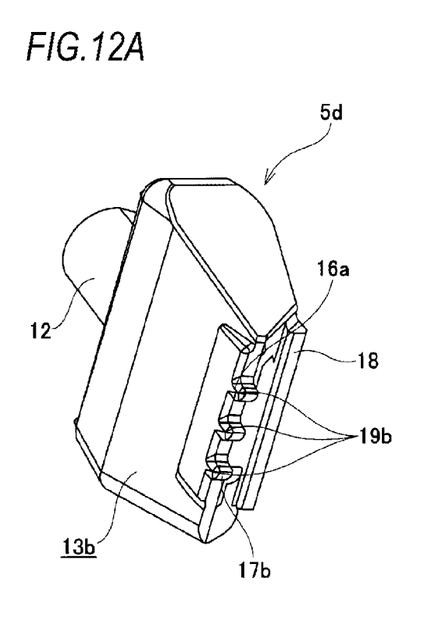
FIGS. 12A and 12B depict a second example of another shape of the protruding part and is similar to FIGS. 11A and 11B.
Figure 12B:
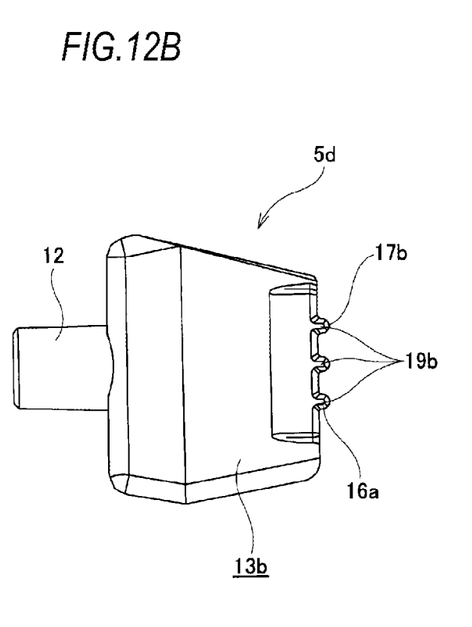

When the protruding part is configured by the plurality of projections, like the second example, the number and shapes of the respective projections can be appropriately changed. That is, for example, like a nozzle for grease application 5c shown in FIGS. 11A and 11B, the tip portions of the projections 19a, 19a may have a semispherical shape, or like a nozzle for grease application 5d shown in FIGS. 12A and 12B, the three projections 19b, 19b may be provided. Like this, the number and shapes of the projections are determined in design, in accordance with an amount and a viscosity of the grease to be applied to the concave-convex part of the member to be applied, depths of the concave portions configuring the concave-convex part, and the like.

The configurations and operations of the other parts are the same as the first example of the embodiment.

INDUSTRIAL APPLICABILITY

The nozzle for grease application of the present invention can be used to apply the grease not only to the worm wheel described in the respective examples of the embodiment but also to a variety of gear members having a concave-convex part formed on an inner or outer peripheral surface thereof.

The present invention is based on a Japanese Patent Application No. 2015-027199 filed on Feb. 16, 2015, which is herein incorporated by reference.

DESCRIPTION OF REFERENCE NUMERALS 1, 1a: grease
2: worm wheel
3: worm wheel teeth
4: grease application device
5, 5a to 5d: nozzle for grease application
6: grease pump
7: grease application gun
8: continuous flow valve 9: grease receptacle
10a to 10c: hose
11: compressed air source
12: mounting part
13, 13a: body part
14, 14a: discharge port
15: column part
16, 16a: protruding part
17, 17a, 17b: grease-pushing surface part
18: protruding wall part
19, 19a, 19b: projection

The invention claimed is:

1. A nozzle for grease application comprising a discharge port provided to open towards a tip end face of a body part, wherein
at a state where the discharge port faces a circumferential concave-convex part formed on a circumferential surface of a member to be applied, while the member to be applied is rotated about a central axis thereof, grease is discharged from the discharge port so that the grease is applied to the concave-convex part,
the tip end face of the body part is provided at a part in front of the discharge port with respect to a rotational direction of the member to be applied with a grease-pushing surface part configured to push the grease into concave portions of the concave-convex part while raking and leveling the grease discharged from the discharge port and attached to the concave-convex part, and
the tip end face of the body part is provided at a rear part of the discharge port with respect to the rotational direction of the member to be applied with a protruding wall part protruding from the tip end face of the body part and configured to prevent a surplus of the grease raked and leveled by the grease-pushing surface part from moving rearwards with respect to the rotational direction of the member to be applied.

2. The nozzle for grease application according to claim 1, wherein
the grease-pushing surface part is provided on a tip end face of a protruding part protruding from the tip end face of the body part and provided at a part of the tip end face of the body part in front of the discharge port with respect to the rotational direction of the member to be applied.

3. The nozzle for grease application according to claim 2, wherein
the protruding part is configured by a plurality of projections intermittently provided in a width direction of the body part.

4. The nozzle for grease application according to claim 2, wherein
a width dimension of the discharge port is smaller than a width dimension of the concave-convex part, and
both a width dimension of the protruding wall part and a width dimension of the grease-pushing surface part are equal to or greater than the width dimension of the concave-convex part.

5. The nozzle for grease application according to claim 1, wherein
a width dimension of the discharge port is smaller than a width dimension of the concave-convex part, and
both a width dimension of the protruding wall part and a width dimension of the grease-pushing surface part are equal to or greater than the width dimension of the concave-convex part.

6. A method for manufacturing a worm-type reducer that has a gear member having a concave-convex part formed on an inner or outer peripheral surface thereof, the method comprising a step of applying the grease to the concave-convex part by the nozzle for grease application according to claim 1.

7. A method for manufacturing an electric power steering device that has a gear member having a concave-convex part formed on an inner or outer peripheral surface thereof, the method comprising a step of applying the grease to the concave-convex part by the nozzle for grease application according to claim 1.

8. A method for manufacturing an automobile that has a gear member having a concave-convex part formed on an inner or outer peripheral surface thereof, the method comprising a step of applying the grease to the concave-convex part by the nozzle for grease application according to claim 1.

9. A method for manufacturing an industrial machine that has a gear member having a concave-convex part formed on an inner or outer peripheral surface thereof, the method comprising a step of applying the grease to the concave-convex part by the nozzle for grease application according to claim 1.

* * * * *